(12) United States Patent
Choi et al.

(10) Patent No.: US 8,605,820 B2
(45) Date of Patent: Dec. 10, 2013

(54) METHOD OF TRANSMITTING DATA IN WIRELESS COMMUNICATION SYSTEM

(75) Inventors: Jin Soo Choi, Seoul (KR); Bin Chul Ihm, Seoul (KR); Min Seok Oh, Seoul (KR); Jae Hoon Chung, Seoul (KR); Wook Bong Lee, Seoul (KR); Seung Hyun Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 615 days.

(21) Appl. No.: 12/672,502

(22) PCT Filed: Jul. 28, 2008

(86) PCT No.: PCT/KR2008/004381
§ 371 (c)(1),
(2), (4) Date: Feb. 5, 2010

(87) PCT Pub. No.: WO2009/020297
PCT Pub. Date: Feb. 12, 2009

(65) Prior Publication Data
US 2011/0274199 A1    Nov. 10, 2011

(30) Foreign Application Priority Data
Aug. 6, 2007 (KR) ........................ 10-2007-0078654

(51) Int. Cl.
H04L 27/36 (2006.01)
(52) U.S. Cl.
USPC ...... 375/298; 375/240.24; 375/267; 375/295; 377/34; 382/237; 700/53
(58) Field of Classification Search
None
See application file for complete search history.

(56) References Cited

U.S. PATENT DOCUMENTS

| | | | |
|---|---|---|---|
| 6,215,813 B1 | 4/2001 | Jones et al. | |
| 2003/0043928 A1 | 3/2003 | Ling et al. | |
| 2003/0103584 A1* | 6/2003 | Bjerke et al. | 375/340 |
| 2009/0003459 A1* | 1/2009 | Limberg | 375/240.26 |
| 2010/0232542 A1* | 9/2010 | Miyoshi et al. | 375/295 |

* cited by examiner

Primary Examiner — Adolf DSouza
(74) Attorney, Agent, or Firm — Lee, Hong, Degerman, Kang & Waimey

(57) ABSTRACT

The method includes generating coded bits by encoding information bits, dividing the coded bits into a first bit-stream and a second bit-stream, generating a first data symbol by performing anti-gray mapping on the first bit-stream, generating a second data symbol by performing gray mapping on the second bit-stream, and transmitting the first data symbol and the second data symbol.

2 Claims, 7 Drawing Sheets

METHOD OF TRANSMITTING DATA IN WIRELESS COMMUNICATION SYSTEM

CROSS-REFERENCE TO RELATED APPLICATIONS

This Application is a National Stage filing under 35 U.S.C. §371 of International Application PCT/KR2008/004381, filed on Jul. 28, 2008, which claims the benefit of earlier filing date and right of priority to Korean Application No. 10-2007-0078654, filed on Aug. 6, 2007.

TECHNICAL FIELD

The present invention relates to wireless communications, and more particularly, to a method of transmitting data for improving reliability of bits in a wireless communication system.

BACKGROUND ART

Digital signals are transmitted through various propagation paths in a wireless communication system. Further, the digital signals are reproduced from a recording medium such as a compact disc (CD) or a digital versatile disc (DVD). When the digital signals are transmitted and reproduced through various channels, various data errors may be caused due to noise and variations.

In order to overcome a data error, an error correction code can be used. The error correction code is a code in which each data signal conforms to specific rules of construction so that information bits in the received signal can generally be automatically detected and corrected.

A turbo code is one of error correction codes used in many wireless communication systems. The turbo code has a relatively simple decoding algorithm and also has a significantly low bit error rate. Basically, the turbo code is a parallel concatenated convolution code. In general, the turbo code applies different arrays of the same bit-stream to a constituent encoder. That is, the same bit-stream is used in the constituent encoder by changing only bit arrangement.

For decoding, the turbo code uses a soft-output iterative decoding scheme. A Viterbi algorithm has generally been used in the convolutional code. Although it is an optimal method for minimizing a bit-stream error, bit-unit information cannot be generated with the Viterbi algorithm. In the decoding process, soft-output information of each bit is exchanged, and the exchanged information is used in a next decoding process, thereby improving performance.

A data transmission/reception process is generally performed in a typical communication system in the following manner. When information bits are input, channel encoding is performed to output coded bits. The coded bits are interleaved and then mapped in a unit of symbols. The mapped symbols are modulated and then transmitted. The symbols transmitted through a channel are de-mapped by a de-mapper. The de-mapped bit information is de-interleaved and then channel-decoded. The channel decoder reports a reliability level of a coded bit and an estimated data bit. The reliability level of the coded bit is interleaved and then input to the de-mapper. This information allows the de-mapper to output improved bit information. The improved bit information is de-interleaved and then input to the channel decoder. In an iterative decoding process, the de-mapper and the channel decoder iterate de-mapping and decoding functions a predetermined number of times while improving the mutual functions, and obtained information on the estimated data bit is finally estimated in a next iteration. Through the iterative decoding, the channel decoder can output the reliability level of the coded bit and the estimated data bit.

Accordingly, in the communication system using the turbo code, decoding performance can be improved by improving reliability of coded bits.

DISCLOSURE OF INVENTION

Technical Problem

A method is sought for improving reliability of coded bits by mapping the coded bits according to different mapping schemes.

Technical Solution

In an aspect, a method of transmitting data in a wireless communication system is provided. The method includes generating coded bits by encoding information bits, dividing the coded bits into a first bit-stream and a second bit-stream, generating a first data symbol by performing anti-gray mapping on the first bit-stream, generating a second data symbol by performing gray mapping on the second bit-stream, and transmitting the first data symbol and the second data symbol.

The coded bits can be generated by using a turbo code. The first bit-stream can be systematic bits and the second bit-stream can be parity bits.

In another aspect, a transmitter includes a channel encoder configured to generate coded bits by encoding information bits, and a mapper comprising a first mapping unit which maps systematic bits among the coded bits by using a first mapping scheme to generate a first data symbol, and a second mapping unit which maps parity bits among the coded bits by using a second mapping scheme to generate a second data symbol.

Advantageous Effects

After channel encoding is performed using a turbo code, reliability is improved both in systematic bits and parity bits. Detection performance can be improved.

MODE FOR THE INVENTION

Figure 1:
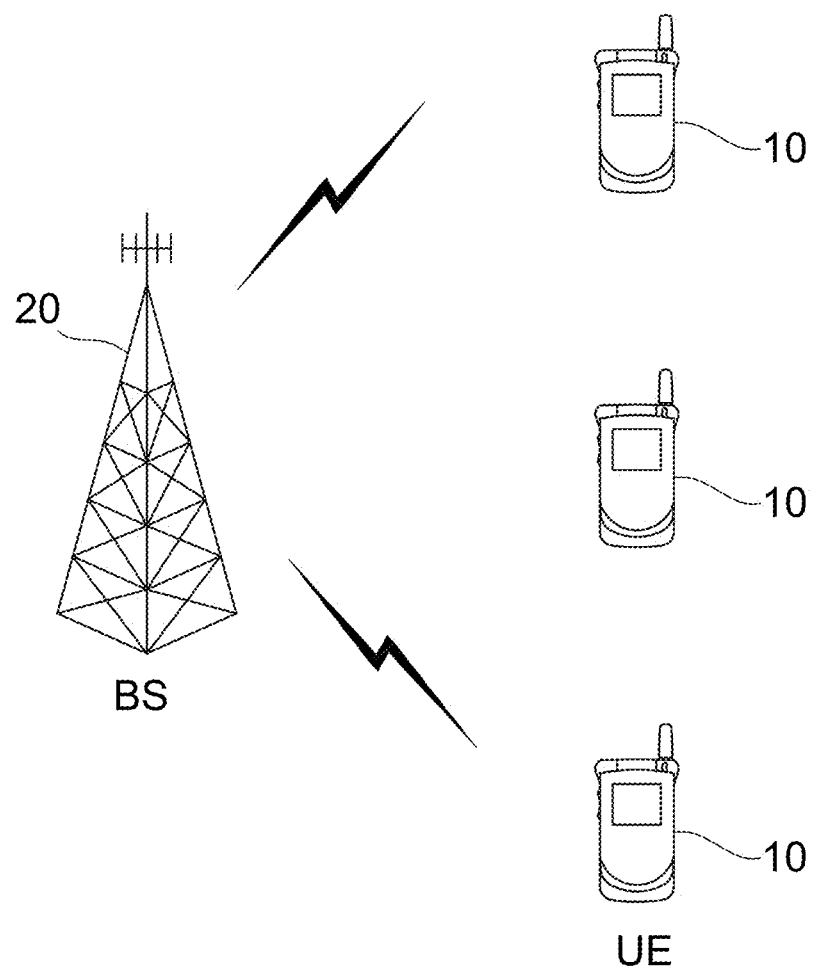
FIG. 1 shows a wireless communication system.

FIG. 1 shows a wireless communication system. The wireless communication system can be widely deployed to provide a variety of communication services, such as voices, packet data, etc.

Referring to FIG. 1, a wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink is defined as a communication link from the BS 20 to the UE 10, and an uplink is defined as a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

The communication system may have one or a plurality of transmit (Tx) antennas. The communication system may be a multiple-input multiple-output (MIMO) system, a multiple-input single-output (MISO) system, a single-input single-output (SISO) system, or a single-input multiple-output (SIMO) system. The MIMO system uses a plurality of Tx antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Figure 2:
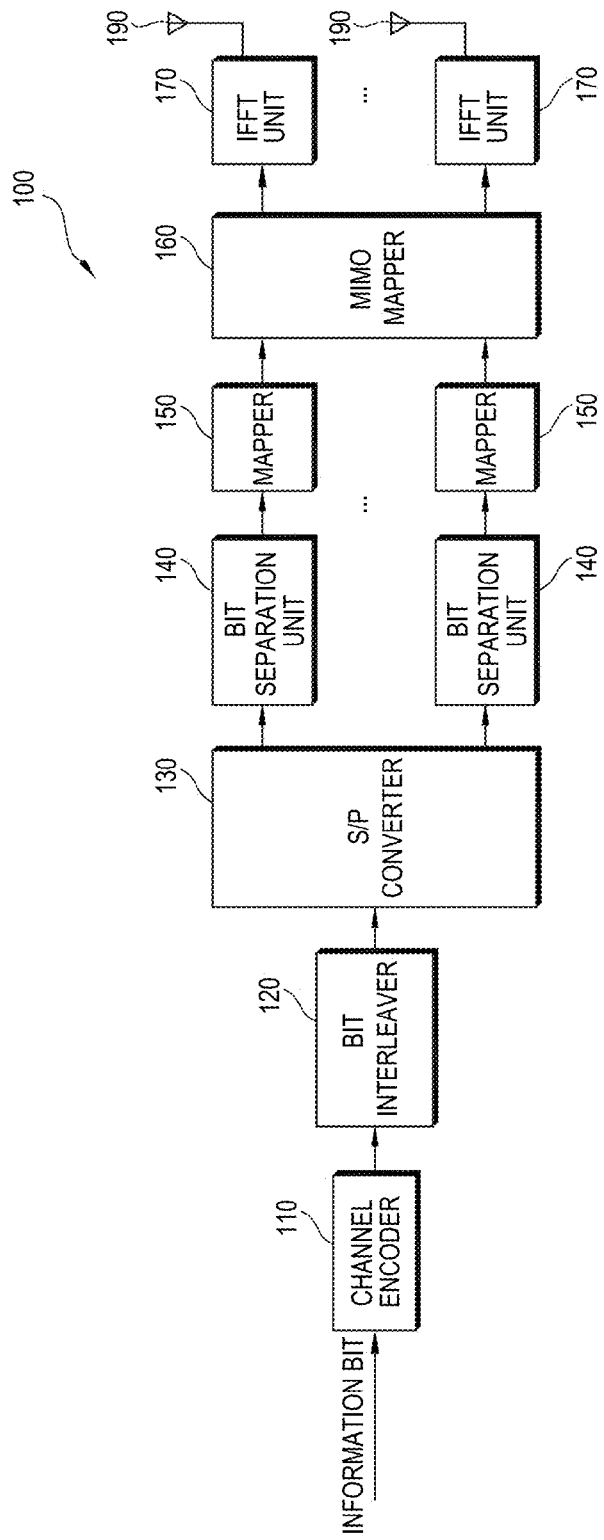
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes a channel encoder 110, a bit interleaver 120, a serial-to-parallel (S/P) converter 130, a bit separation unit 140, a mapper 150, a MIMO precoder 160 and an IFFT unit 170. The transmitter 100 also includes a plurality of Tx antennas 190.

The channel encoder 110 performs channel encoding on information bits and outputs coded bits. A turbo-type code can be used in the channel encoding.

Figure 3:
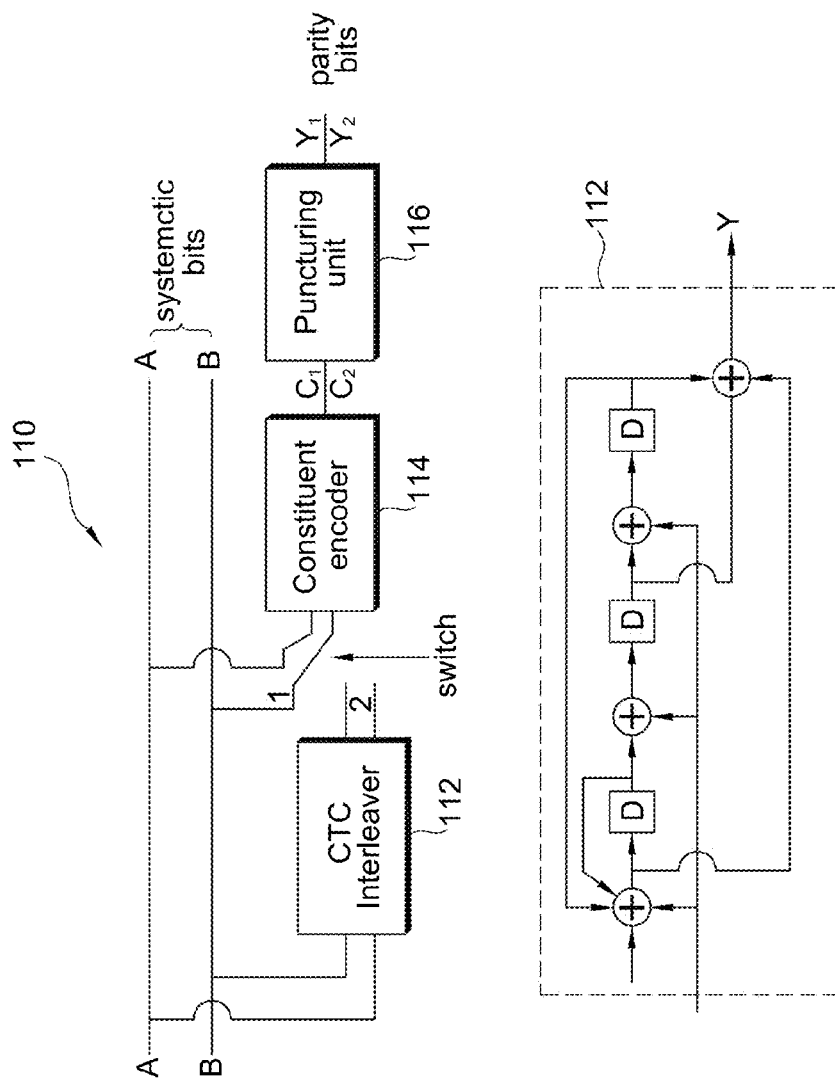
FIG. 3 shows an example of a channel encoder.

FIG. 3 shows an example of the channel encoder. The channel encoder 110 is a convolutional turbo code (CTC) encoder. The section 8.3.3.2.3 of the institute of electrical and electronics engineers (IEEE) 802.16-2004 standard may be incorporated herein by reference.

Referring to FIG. 3, the channel encoder 110 includes a CTC interleaver 112, a constituent encoder 114, and a puncturing unit 116. The channel encoder 110 uses a double binary circular recursive systematic convolutional code. Information bits A and B are input and then encoded by the constituent encoder 114. This encoding process is referred to as $C_1$ encoding. The information bits are interleaved by the CTC interleaver 112 and then encoded by the constituent encoder 114. This encoding process is referred to as $C_2$ encoding.

Two types of bit-streams, i.e., systematic bits and parity bits, can be output from the channel encoder 110. When input to the channel encoder 110, systematic bits (indicated by A or B in FIG. 3) are directly output without further processing. The parity bits (indicated by $Y_1$ or $Y_2$ in FIG. 3) are encoded by the constituent encoder 114.

The structure of channel encoder 110 is shown for exemplary purposes only, and thus the channel encoder 110 may use other turbo-type codes. For example, a channel encoder used in a universal mobile telecommunications system (UMTS) of the 3rd generation partnership project (3GPP) may be implemented by incorporating the section 4.2.3.2 in the 3GPP TS 25.212 V7.1.0 (2006-06) entitled "Multiplexing and channel coding (FDD) (Release 7)" by reference.

Referring back to FIG. 2, the bit interleaver 120 interleaves the coded bits in a bit unit. The bit interleaver 120 spreads centralized errors occurring in a channel, and thus obtains a diversity gain in a bit unit. The S/P converter 130 converts a serial sequence of the interleaved bit-stream into a parallel sequence.

The bit separation unit 140 separates the input bit-stream into systematic bits (i.e., a first bit-stream) and parity bits (i.e., a second bit-stream). If the systematic bits are interleaved together with the parity bits, the bit separation unit 140 can separate the input bit-stream into the systematic bits and the parity bits according to an interleaving pattern. If the systematic bits are interleaved separately from the parity bits, the bit separation unit 140 can simply separate the input bit-stream into the systematic bits and the parity bits. Alternatively, instead of the bit interleaver 120, a symbol interleaver may be disposed next to the mapper 150. In this case, a plurality of pieces of information separated by the bit separation unit 140 can be respectively transmitted via the symbol interleaver.

By applying different mapping schemes to the systematic bits (i.e., the first bit-stream) and the parity bits (i.e., the second bit-stream), the mapper 150 maps the bits onto data symbols. When symbols of a specific bit-stream are represented with locations on a signal constellation, these symbols are referred to as the data symbol. To improve reliability of the bits in iterative decoding, the mapper 150 applies a first mapping scheme (e.g., anti-gray mapping) to the systematic bits and applies a second mapping scheme (e.g., gray mapping) to the parity bits.

The MIMO precoder 160 performs MIMO precoding on input data symbols. The MIMO precoder 160 may use a space-time block code (STBC). For example, if it is assumed that 4 Tx antennas 190 are used and a ¾ orthogonal STBC structure is selected, the STBC can be expressed as shown:

MathFigure 1

$$C = \begin{bmatrix} z_1 & z_2 & z_3 & 0 \\ -z_2^* & z_1^* & 0 & -z_3 \\ -z_3^* & 0 & z_1^* & z_2 \\ 0 & z_3^* & -z_2^* & z_1 \end{bmatrix} \quad [\text{Math. 1}]$$

where $z_j$ denotes a j-th symbol signal transmitted by the transmitter. When the above STBC coding is performed, 3 symbol signals are transmitted for 4 time slots.

The IFFT unit 170 performs an IFFT on input symbols and thus outputs OFDM symbols. The OFDM symbols are transmitted through the Tx antenna 190.

Figure 4:
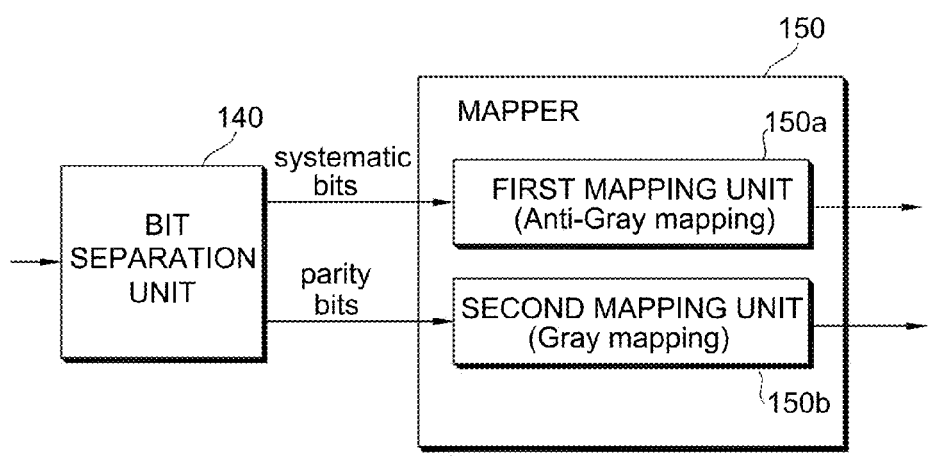
FIG. 4 is a block diagram showing a bit separation unit and a mapper.

FIG. 4 is a block diagram showing the bit separation unit and the mapper.

Referring to FIG. 4, the mapper 150 includes a first mapping unit 150a and a second mapping unit 150b. The first mapping unit 150a performs anti-gray mapping. The second mapping unit 150b performs gray mapping. The bit separation unit 140 separates an input bit-stream into systematic bits and parity bits. The systematic bits are input to the first mapping unit 150a and then subjected to the anti-gray mapping. The parity bits are input to the second mapping unit 150b and then subjected to the gray mapping.

Figure 5:
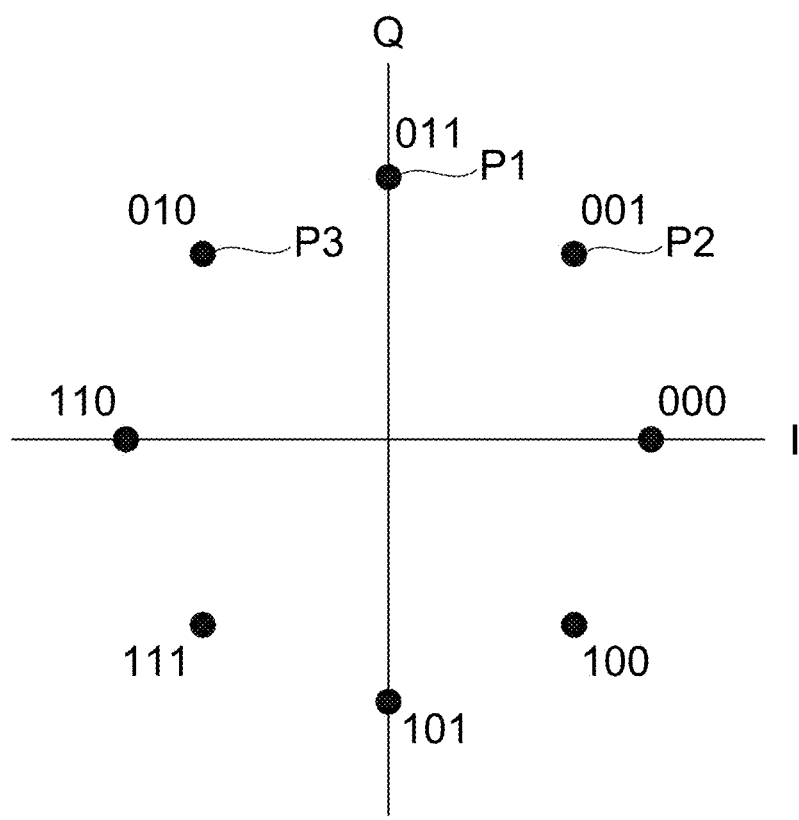
FIG. 5 shows an example of gray mapping in 8-phase shift keying.

FIG. 5 shows an example of gray mapping in 8-phase shift keying (PSK).

Referring to FIG. 5, when adjacent symbols are mapped with the gray mapping, bits representing one symbol are different by only one bit from bits representing the other symbol. For example, if a symbol P1 is represented with bits '011', two symbols P2 and P3 adjacent to the symbol P1 are respectively represented with bits '001' and '010', each of which is different by one bit from the bits representing the symbol P1.

Figure 6:
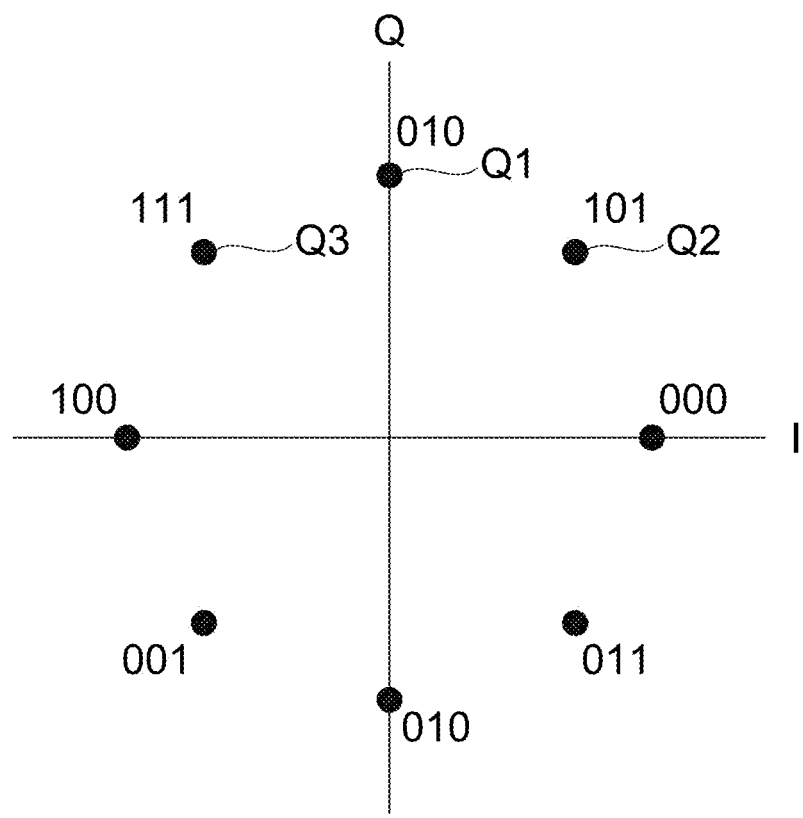
FIG. 6 shows an example of anti-gray mapping.

FIG. 6 shows an example of anti-gray mapping.

Referring to FIG. 6, when adjacent symbols are mapped with the anti-gray mapping, bits representing one symbol are not necessarily different by only one bit from bits representing the other symbol. That is, one or more bits may be different. For example, if a symbol Q1 is represented with bits '010', two symbols Q2 and Q3 adjacent to the symbol Q1 are respectively represented with bits '101' and '111', which are respectively different by three bits and 2 bits from the bits representing the symbol Q1.

Although 8-PSK is shown as an example, quadrature phase shift keying (QPSK), 16-quadrature amplitude modulation (QAM), 64-QAM, 245-QAM, etc., may also be used in the present invention. In addition, bits representing each symbol are shown for exemplary purposes only, and thus various modifications can be made therein as long as requirements of the gray mapping or the anti-gray mapping are satisfied.

When a turbo code is used in iterative decoding, entire system performance can be improved by selecting a suitable mapping scheme. The mapping scheme may use a technique disclosed in the document entitled "Mapping Optimization for Space-Time Bit-Interleaved Coded Modulation With Iterative Decoding" (IEEE Transactions on communications, Vol. 55, No. 4, April 2007 by Wookbong Lee, Jungho Cho, ChangKyung Sung, Hwangjun Song, and Inkyu Lee). Gray mapping or anti-gray mapping may be used without distinguishing systematic bits and parity bits in a process of mapping bit-unit information onto symbols on a signal constellation. In this case, only priori values for the systematic bits are extracted and updated in the iterative decoding process. Thus, a reliability level of the systematic bits can be increased through the iterative decoding process, whereas the reliability level of the parity bits is not increased. The gray mapping outperforms the anti-gray mapping when the iterative decoding process is not performed. On the other hand, when the iterative decoding process is performed, the anti-gray mapping experiences performance improvement while the gray mapping experiences nearly no improvement in performance.

When the iterative decoding is used, performance may deteriorate if the anti-gray mapping is applied to the parity bits whose reliability level is not increased. Performance can be improved when the anti-gray mapping is applied to the systematic bits whose reliability level can be increased through the iterative decoding and when the gray mapping is applied to the parity bits.

Figure 7:
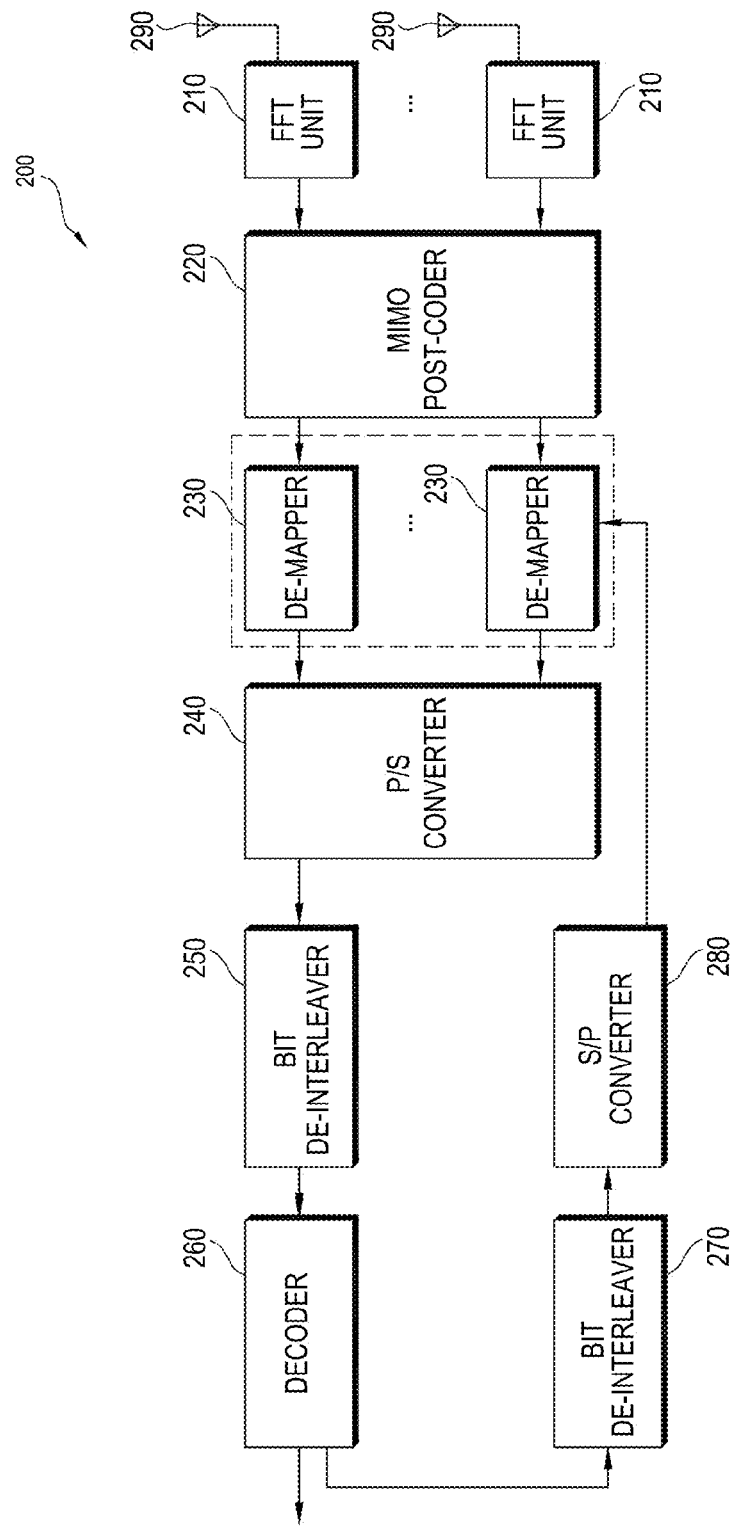
FIG. 7 is a block diagram showing a receiver according to an embodiment of the present invention.

FIG. 7 is a block diagram showing a receiver according to an embodiment of the present invention.

Referring to FIG. 7, a receiver 200 includes an FFT unit 210, a MIMO post-coder 220, a de-mapper 230, a parallel-to-serial (P/S) converter 240, a bit de-interleaver 250, a decoder 260, a bit interleaver 270, and an S/P converter 280. The FFT unit 210 performs an FFT on a signal received from an Rx antenna 290 and outputs a frequency-domain signal. The MIMO post-processor 220 performs post-processing corresponding to the precoding of the MIMO precoder 160.

The de-mapper 230 performs de-mapping on the frequency-domain signal and outputs a soft-output value for estimated bits.

The P/S converter 240 converts a parallel sequence of a bit-stream into a serial sequence. The de-interleaver 250 de-interleaves bits so that the bits are arranged in the same order as before the order of bits are interleaved by the interleaver 120.

The decoder 260 outputs probability information for all received bit signals. The decoder 260 estimates a probability that each data bit of an input bit-stream is '1' or '0', and thus generates the probability information. The bit interleaver 270 changes a bit order of the bit-stream. The S/P converter 280 converts a serial sequence of the bit-stream into a parallel sequence, and delivers the parallel sequence to each de-mapper 230. The de-mapper 230 performs de-mapping by appending the probability information to an original signal. The probability information for each data bit is generated and used so that de-mapping is performed a predetermined number of times on each data bit. This process is referred to as an iterative decoding process.

The probability information of a data bit input to the decoder 260 is as follows. The probability information indicates a reliability level of mapping when input symbol information is mapped. A probability value used herein indicates a probability that the input symbol information is '+1' or '−1'.

MathFigure 2

$$L(d_j^i) = \log \frac{p(d_j^i = +1)}{p(d_j^i = -1)} \quad \text{[Math. 2]}$$

In Equation 2, $d_j^i$ denotes information corresponding to an i-th bit of a j-th symbol. If a probability value $p(d_j^i = +1)$ denotes a probability that a symbol vector value corresponding to a bit value input to the decoder 260 is '+1' and if a probability value $p(d_j^i = -1)$ denotes a probability that the above symbol vector value is '−1', then a ratio of the two probability values is obtained so that a log value of the ratio is defined as probability information provided to each de-mapper 230.

The probability information generated by the decoder 260 is input to the bit interleaver 270. The bit interleaver 270 changes a bit order of the received probability information according to a method used when the orders of the bit-stream are interleaved by the bit interleaver 120 of the transmitter 100. Probability information of each signal is delivered to the de-mapper 230. By appending the received probability information to the previous received symbol signal, the de-mapper 230 can increase an accuracy level of the symbol value. The greater the accuracy level, the more accurately the original bit signal can be restored.

MathFigure 3

$$\log \frac{p(d_j^i = +1 \mid r_j, H_j)}{p(d_j^i = -1 \mid r_j, H_j)} = \log \frac{\sum_{z_j \in S_{+1}^i} p(z_j, r_j, H_j)}{\sum_{z_j \in S_{-1}^i} p(z_j, r_j, H_j)} \quad \text{[Math. 3]}$$

Equation 3 is an example of calculating the probability information value. The probability information value is calculated by substituting channel state information to Equation 1 above. In Equation 3, Sid denotes a set of symbol vectors in which an i-th bit is set to 'd'. The value 'd' may be '+1' or '−1'.

The de-mapping and the decoding are repeated a predetermined number of times. While repeating this process, the probability information value is updated whenever the process is iterated so that the probability information value includes a value calculated through a previous iteration. The probability information value updated by Equation 3 can be generated according to Equation 4 below.

MathFigure 4

$$p(z_j, r_j, H_j) \sim \exp\left(-\frac{1}{N_o}|r_j - \alpha z_j|^2 + \frac{1}{2}\sum_{i=1}^{log_2 M} d_j^i L(d_j^i)\right) \quad \text{[Math. 4]}$$

In Equation 4, $z_j$ denotes a j-th symbol signal transmitted by the transmitter, $r_j$ denotes a j-th symbol signal received by the receiver, and Hj denotes a channel constant when a signal is received through a j-th Rx antenna. In addition, M denotes a size of constellation mapping, and $N_o$ denotes complex noise power.

Equation 4 above includes only a calculation result of Equation 2 above. That is, the calculation result of Equation 2 is substituted to Equations 3 and 4 to generate the probability information. As a result, a transmitted bit signal can be estimated more accurately. By using the de-mapping result, the probability information is re-calculated, and de-mapping is re-performed using the probability information. By repeating this process, an absolute value of an estimated data bit ratio is increased and thus a data bit can be determined more accurately. As such, the estimated data bit is finally estimated after iterating a process of estimating the data bit a predetermined number of times.

After channel encoding is performed using a turbo code, reliability is improved both in systematic bits and parity bits. Therefore, entire system performance can be improved.

The technique described above can be used in uplink transmission and/or downlink transmission. Since a data rate can be increased when reliability of bits is improved, the technique may be more effectively applied in uplink transmission sensitively affected by battery capacity.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A transmitter comprising:
a channel encoder configured to encode information bits to generate coded bits;
a bit separation unit configured to separate the coded bits into systematic bits and parity bits; and
a mapper comprising:
a first mapping unit configured to map the systematic bits among the coded bits according to an anti-gray mapping scheme to generate a first data symbol;
a second mapping unit configured to map parity bits among the coded bits according to a gray mapping scheme to generate a second data symbol; and
a multiple-input multiple-output (MIMO) precoder configured to perform MIMO precoding on the first data symbol and the second data symbol using a space-time block code (STBC) which applies ¾ orthogonal STBC structure,
wherein the STBC is expressed as follows:

$$C = \begin{bmatrix} z_1 & z_2 & z_3 & 0 \\ -z_2^* & z_1^* & 0 & -z_3 \\ -z_3^* & 0 & z_1^* & z_2 \\ 0 & z_3^* & -z_2 & z_1 \end{bmatrix},$$

where $z_j$ denotes a j-th symbol signal transmitted.

2. The transmitter of claim 1, wherein the channel encoder is further configured to encode the information bits according to a turbo code.

* * * * *